3,699,002
DEXTRAN HYDROLIZING ENZYMES
Robert G. Brown, 946 Ritchie Drive, Halifax,
Nova Scotia, Canada
No Drawing. Filed Mar. 6, 1970, Ser. No. 17,343
Claims priority, application Sweden, Mar. 11, 1969,
3,299/69
Int. Cl. C07g 7/028
U.S. Cl. 195—66                                   10 Claims

ABSTRACT OF THE DISCLOSURE

This invention relates to the manufacture of enzyme dextranase by a method which consists essentially of cultivating a microorganism that will grow on the carbon of ketodextran as its energy source in a substrate containing ketodextran. It is well known to make dextranase by cultivating a suitable microorganism on a substrate containing dextran. The essence of this invention is the substitution of ketodextran for dextran. This substitution results in very much increased yields of dextranase. The microorganism must be selected and must be one that will grow on the carbon of ketodextran as its energy source.

The present invention concerns a process for the production of dextran hydrolizing enzymes by means of microorganisms.

The enzyme dextranase hydrolizes dextran by breaking glucoside linkages between the monosacchradie units of the polysaccharide. It can be used for the hydrolysis of dextran, for example, for the partial hydrolysis of native dextran to clinical dextran. A new field of application for dextranase is as an agent for dental care in order to prevent dental caries. In this connection, dextranase hydrolizes the deposits of dextran on the teeth, which are formed by bacteria present on the teeth to prevent or reduce the formation of caries.

A known technically suitable manner of obtaining dextranase is to produce it by cultivating a suitable microorganism on a substrate containing dextran, whereby the microorganisms form dextranase. The dextranase is then recovered.

According to this invention dextranase is produced by microorganisms by a method which comprises cultivating a microorganism that will grow on the carbon of ketodextran as its energy source in a substrate containing ketodextran.

Suitable microorganisms can be selected by enrichment cultivation of microorganisms in a growth medium containing ketodextran wherein the carbon of the ketodextran is substantially the sole energy source for the growth of microorganisms.

It has also been found that a minor amount of an easily assimilated carbohydrate as a supplement for the growth of the microorganism will increase the enzyme yield substantially further. Examples of such carbohydrates are glucose, galactose, mannose, dextran, and sucrose.

The resulting dextranase can be recovered by well known methods.

In those cases when it is desired to purify the dextranase as obtained, this will of course be facilitated by the higher concentration of dextranase in relation to other substances present. For some technical fields of application the dextranase need not be purified but can be recovered as a raw product. In this connection, it is, of course, of value that the dextranase activity per unit of amount is high.

The term "ketodextran" is in this description and in the claims intended to signify a derivative of the dextran characterized in that part of the groups —CH(OH)— having secondary hydroxyl groups in the dextran have been converted to ketogroups —CO—. On each side of this group there is thus a carbon atom. Ketodextran is known and is obtained chemically by suitable oxidation of dextran. The production of ketodextran is described in a paper by De Belder, A.N., B. Lindberg, and S. Svensson, 1968. Synthesis of Ketodextrans, Acta Chem. Scand. 22:949–952. Different methods of oxidation, e.g. by means of dimethylsulfoxide and acetic anhydride, to obtain ketodextran are known, the degree of substitution, i.e. the average number of ketogroups per unit of monosaccharide or per 100 units of monosaccharide in the dextran, can be varied within broad limits. During oxidation of secondary hydroxyl groups, primary hydroxyl groups, if present, may be oxidized simultaneously to aldehyde groups. It is also possible to use such an oxidation product, and the term "ketodextran" includes such products. It is also possible to block hydroxyl groups in the dextran by substituents, such as phenylboronate groups, which can be readily removed later on after the oxidation to ketodextran has taken place. Hereby the oxidation process can be directed to certain free hydroxyl groups if keto groups are desired in definite positions of the monomer unit of the dextran. By the term "ketodextran," for example, is thus meant dextran which has part of its groups —CH(OH)— (having secondary hydroxyl groups) in the glucose rings at carbon atom No. 2, 3 or 4 converted to —CO— groups. This can be illustrated by the following formulae, illustrating the case that the secondary hydroxyl group at carbon No. 3 has been oxidized.

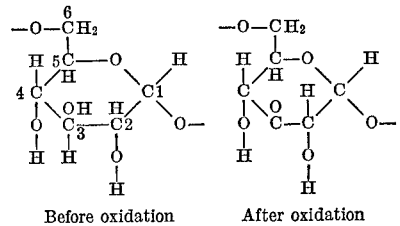

Before oxidation        After oxidation

The substrate and the conditions chosen for the cultivation of the microorganism in the presence of the ketodextran can be selected according to practice when cultivating the microorganism in the presence of the unchanged dextran. The content of ketodextran may also according to practice with unchanged dextran be in the range of from 0.1 to 10 percent in the cultivating medium, e.g. 0.5 to 5 percent. Recovering the enzyme after the cultivation neither offers any difficulty for the skilled person in that this operation can be carried out by using methods commonly applied within the enzyme chemistry. The raw product recovered frequently be used without purification, because the enzyme activity will be very high as a result of the process according to the invention.

The invention will now be illustrated by the following examples:

EXAMPLE 1

1 ml. spore suspension of *Penicillium funiculosum* containing 10⁶ spores was used to inoculate 100 ml. sterile medium of the following composition: ketodextran, 10 g.; yeast extract, 1 g.; MgSO$_4$, 0.5 g.; NH$_4$NO$_3$, 1 g.; KH$_2$PO$_4$, 0.5 g.; K$_2$HPO$_4$, 0.5 g.; water, 1 liter. The culture was grown at 25° C. for 4 days on a rotary shaker in 250 ml. Erlenmyer flasks containing 70 ml. medium. The ketodextran, degree of substitution 20% (i.e. 20 ketogroups per 100 glucose units), used for the above medium was obtained by oxidizing dextran of $\bar{M}_w$ 20,000 with dimethylsulfoxide and acetic anhydride. Extracellular enzymes were assayed by removing the solid phase (the pellets) from the medium by centrifugation, dialyzing the supernatant at 2° C. against distilled water, then lyophilizing the non-dialyzable material. Intracellular enzymes were measured by breaking the cells, mechanically, removing the cell debris by centrifugation and then dialyzing and lyophilizing the supernatant. One unit of enzyme is defined as the amount that will produce the equivalent of 1 u-molo isomaltose monohydrate from dextran ($\overline{M}_w$, 20,000) in 1 hour at 30° C. under the following conditions. The dextran (200 mg.) was dissolved in 10 ml. 0.05 M phosphate buffer, pH 6.0 and dextranase (various amounts in 2 ml. water) was added. Conditions were adjusted so that not more than one-third of the substrate was hydrolized in 1 hour. Using the method described above, the yields of intracellular and extracellular enzymes was 445 units/mg. and 67 units/ml. respectively.

In an identical experiment using the corresponding dextran instead of ketodextran (prior art) yields of 6 units/mg. and 0.6 units/ml. were obtained.

Consequently the yield of dextranase was increased many times by using ketodextran instead of dextran as the substrate.

EXAMPLE 2

Using the same microorganism and the techniques described in Example 1, ketodextran having different degrees of substitution was used for dextranase production. The results of this investigation are reported in Table I.

TABLE I

| Degree of substitution in percent | Intracellular activity, units per mg. | Extracellular activity, units per ml. |
|---|---|---|
| 0 | 6 | 0.6 |
| 2 | 9 | 6.3 |
| 20 | 445 | 67 |
| 35 | 205 | 224 |
| 58 | 205 | 224 |

Ketodextran with 20 to 58% substitution thus resulted in good yields of dextranase. A substitution of 2% resulted in a ten-fold increase of extracellular activity. This is a substantial improvement but not as economic as the higher degrees of substitution.

EXAMPLE 3

In the following example, the medium was supplemented with glucose at a concentration of 0.7, 1.4 and 2.8 mg./ml. Growth conditions and assay procedures were the same as previously described. The degree of substitution of the ketodextran used was 20%. The results are present in Table II.

TABLE II

| Glucose (mg. per ml. medium) | Growth (mg. per ml. medium) | Intracellular activity (units per mg. nondialyzable material) | Extracellular activity (units per ml.) |
|---|---|---|---|
| 0 | 2.0 | 445 | 67 |
| 0.7 | 2.4 | 746 | 170 |
| 1.4 | 4.2 | 762 | 300 |
| 2.8 | 3.8 | 480 | 61 |

As shown in the above table, it is possible to further increase the yield of dextranase by supplementing the growth medium with glucose. Using ketodextran of 20% substitution, the optimum supplement was found to be about 1.4 mg. glucose/ml. This supplement increased the amount of growth and the intracellular dextranase concentration, thereby increasing the yield of intracellular dextranase approximately four times. In addition, the extracellular dextranase concentration increased from 67 to 300 units/ml.

EXAMPLE 4

It is possible to supplement the medium with easily assimilated sugars other than glucose, as shown in the following examples (Table III). The degrees of substitution of the ketodextran used was 35 percent.

TABLE III

| Supplement (1.4 mg. per ml. medium) | Intracellular dextranase units per mg. non-dialyzable material | Extracellular dextranase (units per ml.) |
|---|---|---|
| None | 205 | 224 |
| Glucose | 636 | 444 |
| Galactose | 703 | 476 |
| Sucrose | 516 | 394 |
| Mannose | 550 | 390 |
| Dextran (M.W. 20,000) | | 620 |

These results verify that glucose, galactose, sucrose, dextran and mannose are all good supplements of the ketodextran containing medium. In all cases yields of dextranase were very good.

EXAMPLE 5

In this example, *Penicillium lilacinum* American Type Culture Collection 10114 and *Spicaria violacca* ATCC 10525 and *Penicillium Venuculosum* ATCC 10513 were used to produce dextranase in place of *Penicillium funiculosum*. The degree of substitution of the ketodextran used was 20%. The results of this investigation are reported in Table IV.

TABLE IV

| Organism | Substrate | Intracellular dextranase (units per mg. non-dialyzable material) | Extracellular dextranase (units per ml.) |
|---|---|---|---|
| P. lilacinum | Dextran | 7.4 | 4.5 |
| | Ketodextran | 17.0 | 18.8 |
| | Ketodextran plus 1.4 mg. glucose/ml. | 18.7 | 24.3 |
| S. Violacca | Dextran | 6.0 | 1.5 |
| | Ketodextran plus 1.4 mg. glucose/ml. | 12.0 | 54.4 |
| P. venuculosum | Dextran | | 0.53 |
| | Ketodextran | | 0.24 |
| | Ketodextran plus 1.4 mg. glucose/ml. | | 0.10 |

These examples demonstrate the microorganisms other than *Penicillium funiculosum* can be stimulated to produce increased quantities of dextranase using ketodextran and medium supplements but that not all microorganisms can be so stimulated.

The essential thing about the microorganism is that it will grow on the carbon of ketodextran as its energy source in a substrate that contains ketodextran. *Penicillium funiculosum*, *Penicillium lilacinum* and *Spicaria violacca* have this characteristic. Many other microorganisms could be selected. Suitable microorganisms have been isolated from soil taken from locations where the waste of papermills is discharged. In such a case a growth medium of inorganic salts and ketodextran as substantially the sole source of carbon for microorganism growth is prepared similar to that described in Example 1. The growth medium is inoculated with soil, but only those organisms that are stimulated by ketodextran to produce an increased quantity of dextranase are able to grow. Those microorganisms which cannot so grow do not develop. After growth of about two days a portion of the culture is removed and placed in a fresh medium. This procedure is repeated several times and, following a series of repetitions, a culture is selected that will produce an increased quantity of dextranase as it grows on ketodextran. In some cases, a solid medium is more convenient for the isolation technique; in which case 2% agar may be added to solidify the medium.

*Penicillium funiculosum*, *Penicillium lilacinum* and *Spicaria violacca* each grew to an extent of 2, 0.9 and 0.5 mg. dry weight per millilitre respectively in 100 hours in a medium containing 1 percent ketodextran as an energy source of carbon for growth under the conditions described in Example 1. The degree of substitution of ketodextran was 20 percent.

*Penicillium funiculosum* of Example 1 was isolated from soil which had been exposed to pulp mill wastes as follows. The medium described in Example 1 was solidified with 2% agar. This medium was placed in a Petri plate and a small quantity of soil was sprinkled over the surface of the agar. After 3 days incubation at 25° C. several colonies developed. Inoculum from these colonies was transferred to fresh agar. This was repeated until pure cultures were obtained. One such culture was identified as *Penicillium funiculosum* according to Thom, "The Penicillia."

In another case, a liquid medium having the composition described in Example 1 was used. A small soil sample was placed in 70 ml. medium contained in a 250 ml. Erlenmeyer flask. This was placed on a rotary shaker for three days at 25° C. A small portion of the resulting culture was transferred to fresh liquid medium and incubated another 3 days. This was repeated twice. Finally, the culture was streaked on the solid medium described in the above paragraph. A pure culture of a Penicillium species whose mycelium fragments to give a yeastlike type of growth was isolated. The ability to fragment would be advantageous in large scale fermentations.

Likewise other cultures of Penicillium, not identified as to species, but selected by enrichment cultivation as described above, were stimulated to produce dextranase by ketodextran in cases where the culture growth was at least 0.5 mg. dry weight per ml. in 100 hours in a medium containing 1 percent ketodextran of 20 percent substitution.

The medium contained 0.1 percent yeast extract. This was added as a source of trace minerals, vitamins and growth factors. Although yeast extract at this concentration will support some growth of microorganisms, microorganisms which use ketodextran as a source of carbon, may be distinguished by cultivating on a medium containing both ketodextran and yeast extract plus salts and a medium containing yeast extract plus salts only. Growth will be very much better on the former than the latter.

Yeast, the supplement, in this medium did not affect the isolating properties of the medium in this case because the amount of carbon was so small. Many supplements like yeast extract (e.g. liver extract, meat extract, brain heart infusion extract) contain carbon but care must be exercised to avoid large additions of carbon that would destroy the selectivity of the ketodextran.

Not all organisms will grow sufficiently in the presence of ketodextran to produce an economic increase of dextranase, and in this connection it is specified that the organism is preferably one that, in addition to being one that will grow on the carbon of ketodextran as substantially its sole energy source, will also grow in the medium and conditions specified in Example 1 to at least 0.5 mg. dry weight per ml. in 100 hours on ketodextran with a degree of substitution of 20 percent.

What I claim as my invention is:

1. A method for the production of dextranase by means of microorganisms which comprises cultivating a microorganism that will grow on the carbon of ketodextran as its source of energy on a substrate containing ketodextran, and recovering the dextranase produced from the substrate, said microorganism having a growth rate of at least 0.5 mg. dry weight per ml. in 100 hours on a substrate consisting of ketodextran, 10 g.; yeast extract, 1 g.; $MgSO_4$, 0.5 g.; $NH_4NO_3$, 1 g.; $KH_2PO_4$, 0.5 g.; $K_2HPO_4$, 0.5 g.; water, 1 liter, and wherein the degree of substitution of the ketodextran is 2 to 58 percent.

2. A method for the production of dextranase by means of microorganisms as claimed in claim 1, in which the substrate contains an easily assimilated carbohydrate.

3. A method for the production of dextranase by means of microorganisms as claimed in claim 2, in which said easily assimilated carbohydrate is taken from the group comprising glucose, galactose, sucrose, dextran and mannose.

4. A method for the production of dextranase as claimed in claim 1 in which the degree of substitution of the ketodextran is 20 percent.

5. A method for the production of dextranase as claimed in claim 1 in which the microorganism is taken from the group *Penicillium funiculosum, Penicillium lilacinum*, and *Spicaria violacca*.

6. A method for the production of dextranase by means of microorganisms as claimed in claim 2, in which said easily assimilated carbohydrate is taken from the group comprising glucose, galactose, sucrose, dextran and mannose, and in which the microorganis is taken from the group *Penicillium funiculosum, Penicillium lilacinum*, and *Spicaria violacca*.

7. A method for the production of dextranase by means of microorganisms as claimed in claim 4, in which the substrate contains an easily assimilated carbohydrate.

8. A method for the production of dextranase by means of microorganisms as claimed in claim 7, in which said easily assimilated carbohydrate is taken from the group comprising glucose, galactose, sucrose, dextran and mannose.

9. A method for the production of dextranase as claimed in claim 7 in which the microorganism is taken from the group *Penicillium funiculosum, Penicillium lilacinum*, and *Spicaria violacca*.

10. A method for the production of dextranase by means of microorganisms as claimed in claim 7, in which said easily assimilated carbohydrate is taken from the group comprising glucose, galactose, sucrose, dextran and mannose, and in which the microorganism is taken from the group *Penicillium funiculosum, Penicillium lilacinum, Penicillium veniculosum* and *Spicaria violacca*.

References Cited
UNITED STATES PATENTS 2,742,399    4/1956    Tsuchiya et al. ----- 195—31 P ALVIN E. TANENHOLTZ, Primary Examiner U.S. Cl. X.R.

195—100